April 12, 1960 C. LIFKA 2,932,532
CONNECTOR MEANS FOR FLEXIBLE CONDUIT
Filed Jan. 17, 1958
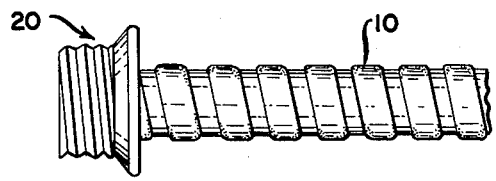
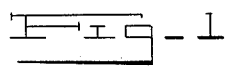
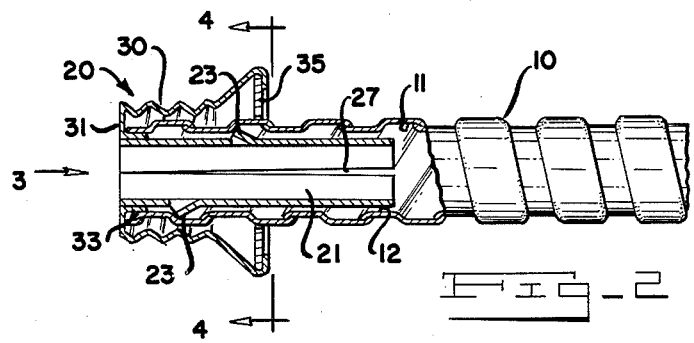
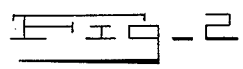
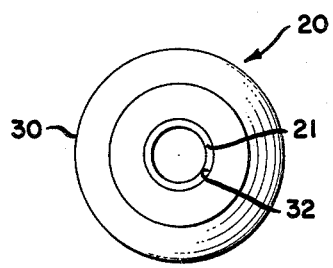
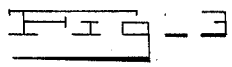
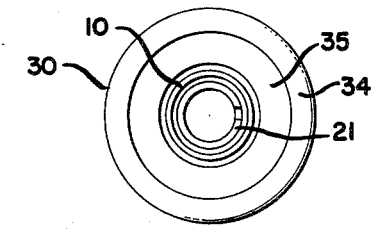
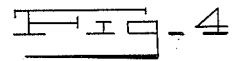
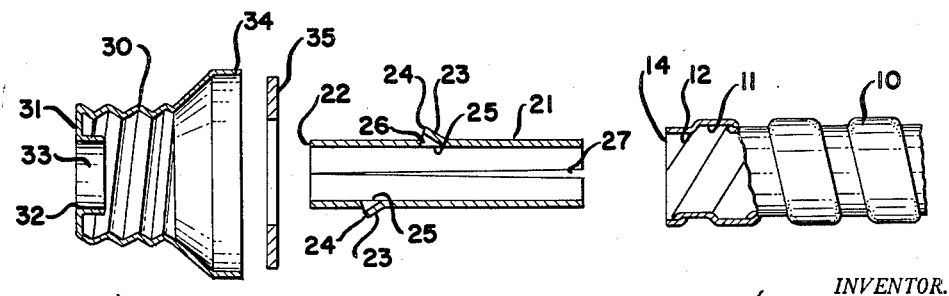
*INVENTOR.*
CHARLES LIFKA
BY
ATTORNEYS
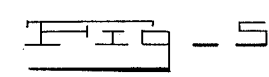

# United States Patent Office 2,932,532
Patented Apr. 12, 1960

2,932,532

CONNECTOR MEANS FOR FLEXIBLE CONDUIT

Charles Lifka, Detroit, Mich.

Application January 17, 1958, Serial No. 709,694

1 Claim. (Cl. 285—161)

This application relates to sleeve and ferrule type connectors for flexible conduit and particularly for flexible conduit of the type known to the trade as "Greenfield" and characterized by the fact that the conduit comprises a ribbed or ridged strip helically wound to provide a helical groove in the interior of the conduit whose turns are separated by a helical ridge.

An object of the present invention is to provide a connector means which embodies improvements over the sleeve and ferrule connector means shown in my prior Patent No. 2,784,010 of March 5, 1957.

One improvement is in the manner of securing the sleeve of the connector to the ferrule of the connector.

Another improvement is in the provision of a tube which is inwardly radially spaced considerably from the threaded ferrule so that the forward end of a section of "Greenfield" can be telescoped into the annular space between the tube and the ferrule.

Still another improvement is in the provision of two planar walls for the ferrule. The forward wall provides a means for securing the sleeve to the ferrule and the rearward wall provides a means for partially and rearwardly closing the space between the sleeve and the ferrule so as to close rearwardly the space between a piece of "Greenfield" and the ferrule.

An important characteristic of the present device is that the forward end of the piece of "Greenfield" is telescoped into the space between the ferrule and the sleeve which is radially spaced inwardly from the ferrule and which fits inside the "Greenfield." Thus, the forward end of the piece of "Greenfield" is concealed and guarded as well by the fitting.

One embodiment of the invention is disclosed in the appended drawing.

In this drawing:

Fig. 1 is an elevation view of the connector mounted within a flexible conduit.

Fig. 2 is a view similar to Fig. 1, but enlarged and with portions cut away for illustration purposes.

Figs. 3 and 4 are views taken in the directions of arrows 3 and 4—4 of Fig. 2.

Fig. 5 is an exploded view of the parts prior to their being joined.

Referring to the drawing, it will be observed that the flexible conduit known to the trade as "Greenfield" and shown therein at 10 is made up of a strip of rigid sheet metal helically wound to provide a helical groove 11 in the interior of the conduit whose turns are separated by a helical ridge 12. The forward edge of the piece of "Greenfield" is referenced 14.

The connector 20 comprises a thin wall sheet material tubular sleeve 21 formed to fit inside the conduit and having a forward end 22.

The sleeve has stamped out lugs 23. These are the same as those shown in my said patent. They are angularly and longitudinally spaced as indicated in the drawing in position to interlock with the helical ridge 12 of the conduit. Each lug 23 is struck out of the sleeve and has a forward transverse edge 24 for cooperation with the ridge. Each lug is of rounded U form with all of the edge 25 of the lug other than the forward transverse edge 24 being unseparated from the sleeve. The forward transverse edge of the lug is laterally humped and separated from the sleeve by a transverse slit 26 and projects radially outwardly from the sleeve. In the preferred embodiment there are two lugs 180° apart and spaced longitudinally from each other one turn of the helical ridge of the conduit. The forward transverse edge 24 of each lug is as shown at an oblique angle to the longitudinal axis of the sleeve. Each lug slopes downwardly and rearwardly from the transverse forward edge 24.

The sleeve is made of a flat strip of sheet metal or the like rolled into a tube and split at 27 and the lugs are stamped out of the sleeve. The split 27 is V-shaped, being slightly larger at the rear end of the tube or sleeve than at the forward end to facilitate the accommodation of the sleeve to variations in internal diameter of "Greenfield" with which the sleeve is to be used.

Means are provided on the forward end 22 of the sleeve for securing it and the conduit secured to it by cooperation of the lugs in the ridge to any associated member such as an outlet box or a conduit fitting. Such means comprises an externally threaded sheet metal ferrule 30 having an annular planar forward wall 31 formed with a central hole whose edge 32 is formed with an annular flange 33. The rear edge 34 of the ferrule is crimped over a flat washer 35 to interlock the ferrule and such washer.

The forward end 22 of the sleeve 21 fits inside the flange 33 and is welded to the ferrule at that point.

The lugs 23 interlock with the ridge of the conduit at the edge of the ridge and will lock the sleeve to the conduit end hand tight so that the sleeve will not back off from the conduit and so as to be non-removable in ordinary use. The lugs are spaced apart longitudinally and axially and the forward edges of the lugs are at oblique angles whereby the lugs conform to the helical formation of the conduit. In the preferred embodiment the lugs are longitudinally spaced as shown with the forward lug being just inside the washer 35 and with the rear lug being spaced rearwardly from the washer 35 a distance of about ¼ inch.

It is to be noted that the sleeve is extremely thin, and hence does not reduce the internal diameter of the conduit materially, thus, not depriving the interior of the conduit of cross-sectional area needed for free pulling of wires in the conduit or raceway to any material extent. In the preferred embodiment where the "Greenfield" is of a size known as ⅜ inch, with its interior diameter being ⅜ inch or slightly larger, the sleeve is carefully made so as to have an internal diameter of not less than 0.375 inch, sometimes being slightly larger. The ⅜ inch size of "Greenfield" is extensively used in the manufacture and installation of equipment, appliances, heating devices, air conditioning devices, and so forth. Because of the close spaced quarters in which such conduit is used in such equipment and also for installing such equipment, it is extremely important that an effective and satisfactory connector fitting be provided and this I have done with the connector herein disclosed.

It is further to be noted that the forward edge or end 14 of the conduit is telescoped inside the ferrule 30 between the ferrule and the sleeve 21 and is stopped by the forward wall 31 and is concealed at all times by the washer 35. Thus, the forward end or edge of the conduit is never exposed and the entrance to the conduit is defined by the hole in the flat wall 31 and the forward end of the sleeve 22 within the flange 33.

It is further noted that in assembling the connector onto a piece of conduit, the sleeve 21 of the assembled connector acts as a means for piloting the connector onto the conduit.

Now having described the connector means for flexible conduit herein disclosed, reference should be had to the claim which follow:

I claim:

Connector means for flexible conduit of the type known to the trade as "Greenfield" and characterized by the fact that it is ridged strip helically wound to provide a helical groove in the interior of the conduit whose turns are separated by a helical ridge, the connector means comprising a sleeve, a sheet metal ferrule and a flat washer joined together as a single unit; the sleeve being a thin walled sheet metal tubular sleeve formed to fit inside the conduit when the sleeve is threaded into an end of the conduit, and having two stamped out lugs 180 degrees apart angularly and longitudinally spaced in position to interlock into the helical groove and with the helical ridge of the conduit; the ferrule surrounding the sleeve and having a threaded outer wall and a transverse forward flat wall having a central hole whose edge is spaced radially inwardly from the other wall, the hole having a retroverted flange of annular form surrounding and receiving the forward end of the sleeve and being permanently secured to the sleeve for securing the sleeve and the ferrule together, with the forward flat wall forwardly closing the space between the sleeve and the outer wall, with the annular space between the flange and the outer wall being adapted to receive the forward end of a conduit inside the ferrule, the outer wall having its rear end tapered outwardly a considerable distance and terminating in an inwardly turned flange; and a flat annular washer arranged inside the ferrule and permanently locked between such flange and the outer-most portion of the outer wall tapered rear end and partially closing the space between the sleeve and the ferrule at the rear of the ferrule, with the sleeve passing through the hole in the washer and the annular space between the edge of such hole and the sleeve being adapted to receive a conduit inside the ferrule; the sleeve being approximately twice the length of the ferrule whereby the rear end flange and washer of the ferrule are approximately midway between the ends of the sleeve; the sleeve lugs being inside the ferrule between its forward flat wall and its rear end flange.

References Cited in the file of this patent
UNITED STATES PATENTS

| | | |
|---|---|---|
| 270,064 | Hickman | Jan. 2, 1883 |
| 1,725,883 | Recker | Aug. 27, 1929 |
| 1,800,348 | Hunter | Apr. 14, 1931 |
| 1,830,276 | Hunter | Nov. 3, 1931 |
| 1,850,792 | Frederickson | Mar. 22, 1932 |
| 2,038,217 | Heidloff | Apr. 21, 1936 |
| 2,262,228 | Garretson | Nov. 11, 1941 |
| 2,458,276 | Langley | Jan. 4, 1949 |
| 2,535,186 | Anderson | Dec. 26, 1950 |
| 2,782,060 | Appleton | Feb. 19, 1957 |
| 2,784,010 | Lifka | Mar. 5, 1957 |

FOREIGN PATENTS

| | | |
|---|---|---|
| 22,737 | France | Feb. 21, 1921 |